(12) United States Patent
Fujiwara

(10) Patent No.: US 10,375,377 B2
(45) Date of Patent: Aug. 6, 2019

(54) INFORMATION PROCESSING TO GENERATE DEPTH INFORMATION OF AN IMAGE

(71) Applicant: SONY CORPORATION, Tokyo (JP)

(72) Inventor: Tatsuo Fujiwara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 633 days.

(21) Appl. No.: 14/476,966

(22) Filed: Sep. 4, 2014

(65) Prior Publication Data
US 2015/0077525 A1 Mar. 19, 2015

(30) Foreign Application Priority Data

Sep. 13, 2013 (JP) ................................. 2013-190716

(51) Int. Cl.
| | |
|---|---|
| G06K 9/00 | (2006.01) |
| H04N 13/221 | (2018.01) |
| G06T 7/593 | (2017.01) |
| G06T 7/70 | (2017.01) |

(52) U.S. Cl.
CPC ........... *H04N 13/221* (2018.05); *G06T 7/593* (2017.01); *G06T 7/70* (2017.01); *G06T 2207/10012* (2013.01); *G06T 2207/30244* (2013.01)

(58) Field of Classification Search
CPC ........ G06T 7/0065; G06T 17/00; G06T 7/593
See application file for complete search history.

(56) References Cited

U.S. PATENT DOCUMENTS

| | | | | |
|---|---|---|---|---|
| 2003/0218607 A1* | 11/2003 | Baumberg | ............ | G06T 7/0024 345/419 |
| 2004/0175042 A1* | 9/2004 | Kroeker | ................... | G06K 9/20 382/192 |
| 2004/0189686 A1* | 9/2004 | Tanguay, Jr. | ........... | G06Q 40/08 715/716 |
| 2007/0104360 A1* | 5/2007 | Huang | ............... | G06K 9/00255 382/154 |
| 2010/0316282 A1* | 12/2010 | Hope | ........................ | G06T 7/55 382/154 |
| 2011/0066375 A1* | 3/2011 | France | ................... | G01C 15/00 701/469 |

(Continued)

FOREIGN PATENT DOCUMENTS

JP 2012-150614 A 8/2012

*Primary Examiner* — Rebecca A Volentine
(74) *Attorney, Agent, or Firm* — Chip Law Group

(57) ABSTRACT

There is provided an information processing apparatus including an acquisition unit configured to acquire one standard image and images of lower resolution than resolution of the standard image, the standard image and images of lower resolution being acquired through image shooting by one camera, a camera posture estimating unit configured to estimate a first camera posture in which the standard image has been shot and second camera postures in which the images have been shot, a storage unit configured to store each of the images along with each of the second camera postures, and a depth information generating unit configured to generate depth information on the standard image by using the standard image, an image obtained by lowering the resolution of the standard image and the first camera posture, and at least a part of the images and a second camera posture for the part of the images.

11 Claims, 13 Drawing Sheets

(56) References Cited

U.S. PATENT DOCUMENTS

| | | | |
|---|---|---|---|
| 2012/0163672 A1* | 6/2012 | McKinnon | G06T 7/0075 |
| | | | 382/106 |
| 2013/0100119 A1* | 4/2013 | Evertt | G06K 9/00201 |
| | | | 345/419 |
| 2014/0112573 A1* | 4/2014 | Francis, Jr. | G01B 11/2513 |
| | | | 382/154 |
| 2014/0139639 A1* | 5/2014 | Wagner | H04N 13/0253 |
| | | | 348/46 |
| 2014/0184852 A1* | 7/2014 | Niemi | H04N 5/2356 |
| | | | 348/239 |
| 2014/0206443 A1* | 7/2014 | Sharp | G06T 7/0075 |
| | | | 463/31 |
| 2014/0270480 A1* | 9/2014 | Boardman | G06T 17/00 |
| | | | 382/154 |
| 2014/0368620 A1* | 12/2014 | Li | H04N 13/0282 |
| | | | 348/50 |
| 2016/0042523 A1* | 2/2016 | Unten | G06T 7/0075 |
| | | | 348/50 |
| 2016/0163098 A1* | 6/2016 | Blanchflower | G06T 15/50 |
| | | | 345/419 |

* cited by examiner

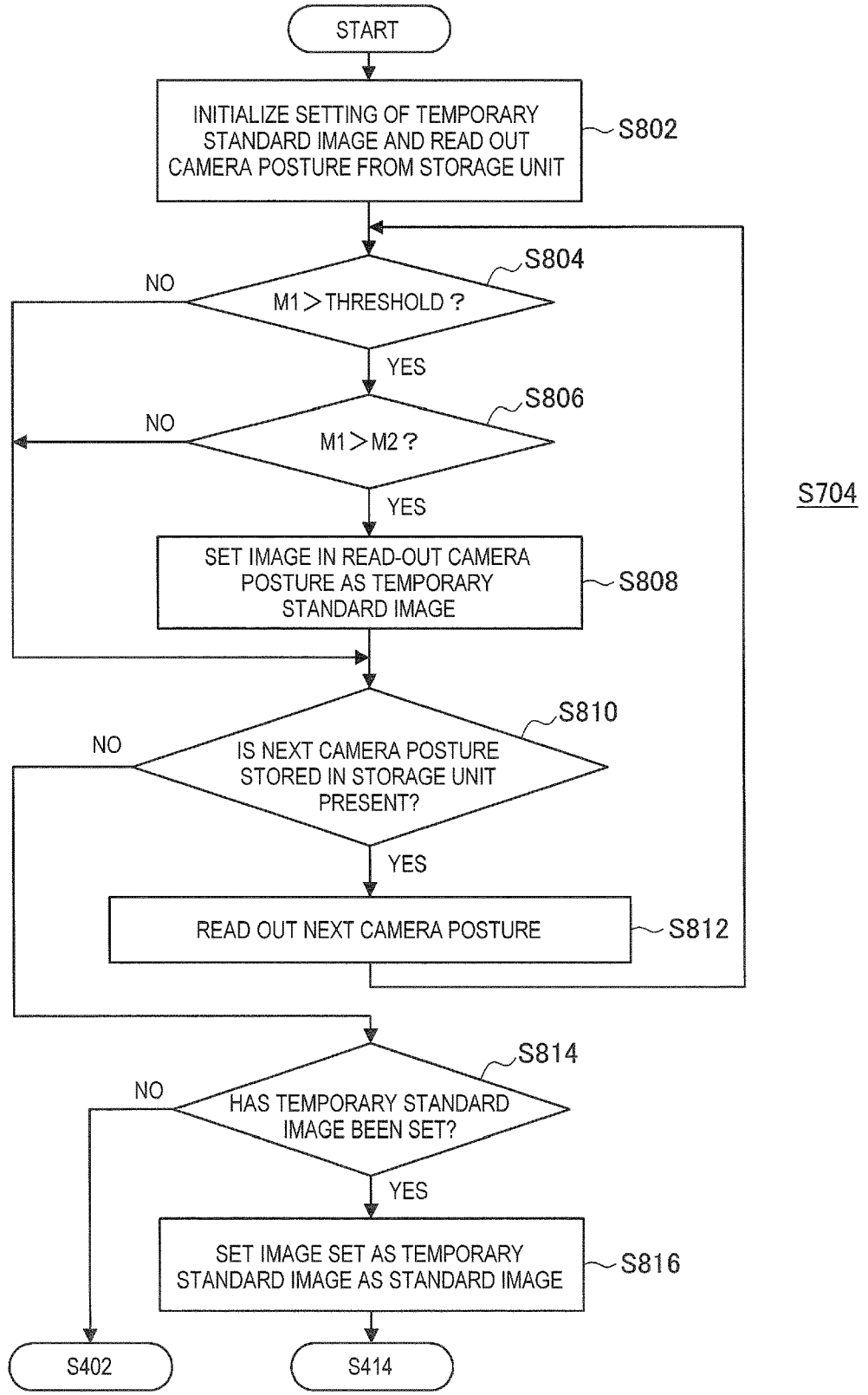

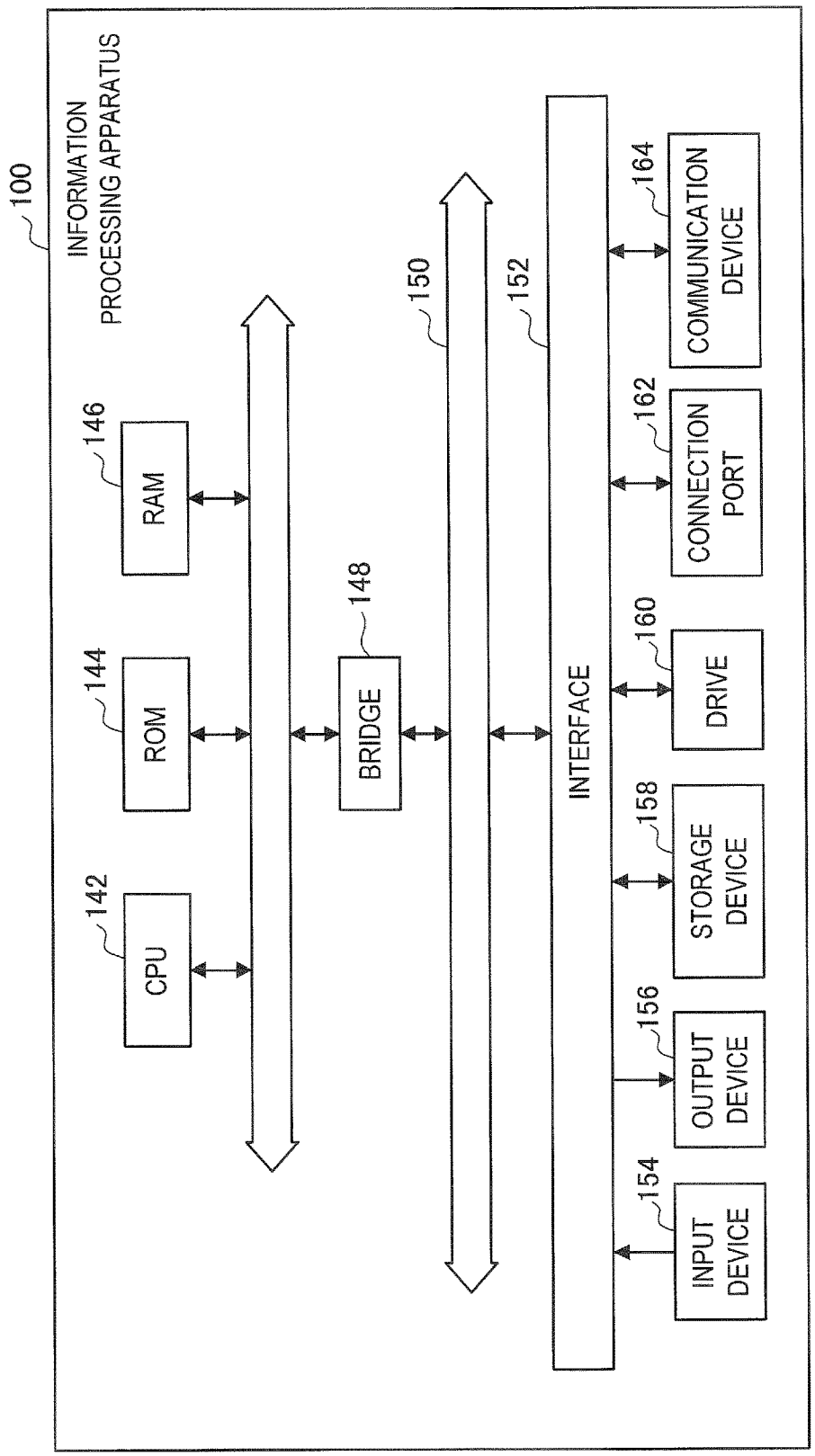

INFORMATION PROCESSING TO GENERATE DEPTH INFORMATION OF AN IMAGE

CROSS REFERENCE TO RELATED APPLICATIONS

This application claims the benefit of Japanese Priority Patent Application JP 2013-190716 filed Sep. 13, 2013, the entire contents of which are incorporated herein by reference.

BACKGROUND

The present disclosure relates to an information processing apparatus and an information processing method.

Electronic apparatuses such as television sets and smartphones capable of displaying three-dimensional images have been recently available in the market. This leads to the development of electronic apparatuses or applications capable of generating and editing three-dimensional images.

Images from some viewpoints acquired through image shooting are usually necessary for the generation of a three-dimensional image. Accordingly, images of high resolution are necessary for the generation of a three-dimensional image of high resolution. Imaging apparatuses that offer images of high resolution are, however, more expensive than imaging apparatuses that offer images of low resolution, so that it costs very much to generate three-dimensional images of high resolution.

JP 2012-150614A shows a method of combining an image of high resolution with an image of low resolution to acquire a virtual viewpoint image of high resolution and save the cost.

SUMMARY

The disclosure of JP 2012-150614A, however, uses some cameras to acquire a virtual viewpoint image because one camera is used to shoot an image of high resolution and the other camera is also used to shoot an image of low resolution.

In addition, images of high resolution usually use more data than images of low resolution do. When images of high resolution are used for processing, the storage capacity and processing performance according thereto are necessary.

The present disclosure has then devised a novel and improved information processing apparatus and information processing method that can reduce a hardware resource used for the generation of depth information of an image.

According to an embodiment of the present disclosure, there is provided an information processing apparatus including an acquisition unit configured to acquire one standard image and images of lower resolution than resolution of the standard image, the standard image and images of lower resolution being acquired through image shooting by one camera, a camera posture estimating unit configured to estimate a first camera posture in which the standard image has been shot and second camera postures in which the images have been shot, a storage unit configured to store each of the images along with each of the second camera postures, and a depth information generating unit configured to generate depth information on the standard image by using an image obtained by lowering the resolution of the standard image and the first camera posture, and at least a part of the images and a second camera posture for the part of the images.

According to one or more of embodiments of the present disclosure, there are provided an information processing apparatus and an information processing method that can each reduce a hardware resource used for the generation of depth information of an image.

The above-mentioned advantageous effects are not necessarily limited thereto, but any other effects that are shown in the present specification or can be grasped from the present specification may also be attained in combination with or instead of the above-mentioned advantageous effects.

BRIEF DESCRIPTION OF THE DRAWINGS

FIG. 12 is a flowchart schematically illustrating processing of determining whether it is possible to set a standard image in the second embodiment of the present disclosure; and FIG. 13 is an explanatory diagram illustrating a hardware configuration of an information processing apparatus according to an embodiment of the present disclosure.

DETAILED DESCRIPTION OF THE EMBODIMENT(S)

Figure 1:
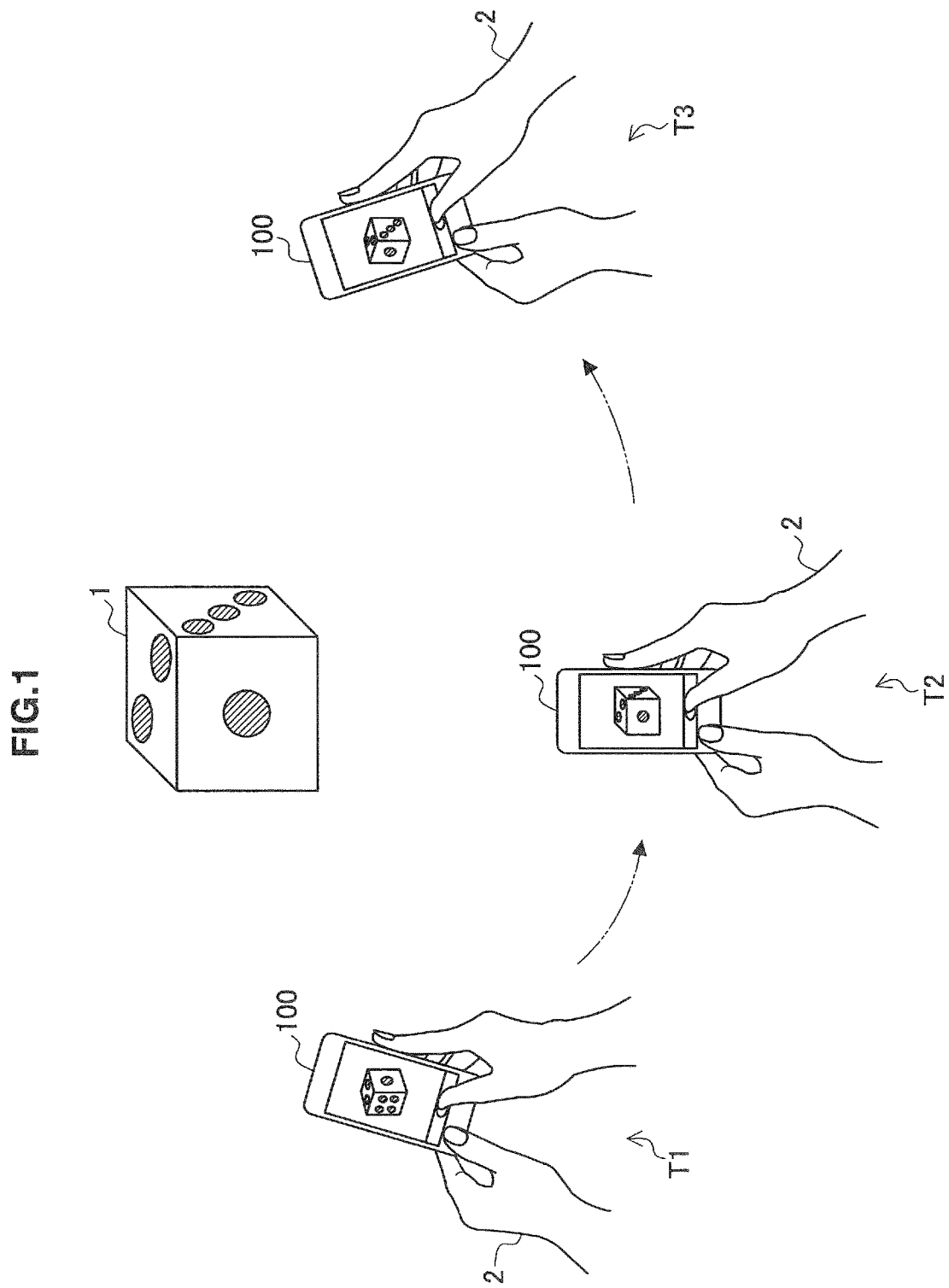
FIG. 1 is a diagram for describing an overview of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Information Processing Apparatus according to Embodiment of Present Disclosure
2. First Embodiment
   2-1. Configuration of Information Processing Apparatus
   2-2. Processing by Information Processing Apparatus
   2-3. Example of Guidance Screen
   2-4. Example Behavior of Information Processing Apparatus when Images Necessary for Generation of Depth Information Lacks
3. Second Embodiment
   3-1. Configuration of Information Processing Apparatus
   3-2. Processing by Information Processing Apparatus
4. Hardware Configuration
5. Conclusion

1. OVERVIEW OF INFORMATION PROCESSING APPARATUS ACCORDING TO EMBODIMENT OF PRESENT DISCLOSURE

First, an overview of an information processing apparatus according to an embodiment of the present disclosure will be described with reference to FIG. 1. FIG. 1 is a diagram for describing an overview of an information processing apparatus according to an embodiment of the present disclosure. An information processing apparatus 100 illustrated in FIG. 1 is a portable mobile terminal that is moved by a user, and has a camera built therein, the camera functioning as an imaging device. The information processing apparatus 100 are repeatedly shooting images while a user is moving the information processing apparatus 100. This allows the information processing apparatus 100 to offer images showing the same subject from a variety of positions and directions.

The information processing apparatus 100 is, for example, repeatedly shooting images of a subject dice 1 while the information processing apparatus 100 is being moved from T1 to T3 as illustrated in FIG. 1. This allows the information processing apparatus 100 to offer images showing the dice 1 from a variety of positions and directions. The position and the direction of the information processing apparatus 100, i.e. the position and the direction of the camera built in the information processing apparatus 100, will be also referred to as camera posture below.

The information processing apparatus 100 sequentially stores images acquired through image shooting in a variety of camera postures, and the camera postures in which the respective images have been shot, and generates depth information on the basis of the stored images and the stored camera posture for each image, the depth information indicating a relative distance of a subject in the depth direction in a standard image. For example, when the information processing apparatus 100 treats an image acquired through image shooting at T3 illustrated in FIG. 1 as a standard image, the information processing apparatus 100 can generate depth information on a subject in the standard image on the basis of a result of matching of the subject in the standard image with subjects in images acquired through image shooting before the information processing apparatus 100 arrives at T3 and a relationship between a camera posture in which the standard image has been shot and a camera posture in which each of the images has been shot.

If the information processing apparatus 100 stores images acquired through image shooting with the images unreduced, the storage capacity for the images and the processing burdens for matching are increased. The information processing apparatus 100 according to the present embodiment reduces images to be used for matching with a standard image such that the resolution of the images is lower than the resolution of the standard image, and stores the images unreduced. A reduced standard image is used when depth information is generated. For example, when an image acquired through image shooting is of Video Graphics Array (VGA), the information processing apparatus 100 reduces the image into an image of Quarter Quarter Video Graphics Array (QQVGA) and then stores the reduced image.

As discussed above, the information processing apparatus 100 according to the present embodiment reduces images acquired through image shooting in a variety of camera postures, sequentially stores the reduced images and camera postures in which the respective images have been shot, and generates depth information on a standard image on the basis of the stored images and the stored camera postures for the respective images. This reduces the storage capacity for the images and the processing burdens for the generation of depth information, allowing the storage capacity and the processing performance for the generation of depth information to be reduced.

Although FIG. 1 illustrates a smartphone as an example of the information processing apparatus 100, the information processing apparatus 100 may also be a mobile terminal such as digital cameras, mobile game consoles, and personal digital assistants (PDAs). For convenience of explanation, the numbers corresponding to embodiments will be added to the ends of information processing apparatuses 100 according to a first embodiment and a second embodiment like an information processing apparatus 100-1 and an information processing apparatus 100-2 to distinguish the respective information processing apparatuses 100 from each other.

2. FIRST EMBODIMENT

2-1. Configuration of Information Processing Apparatus

Figure 2:
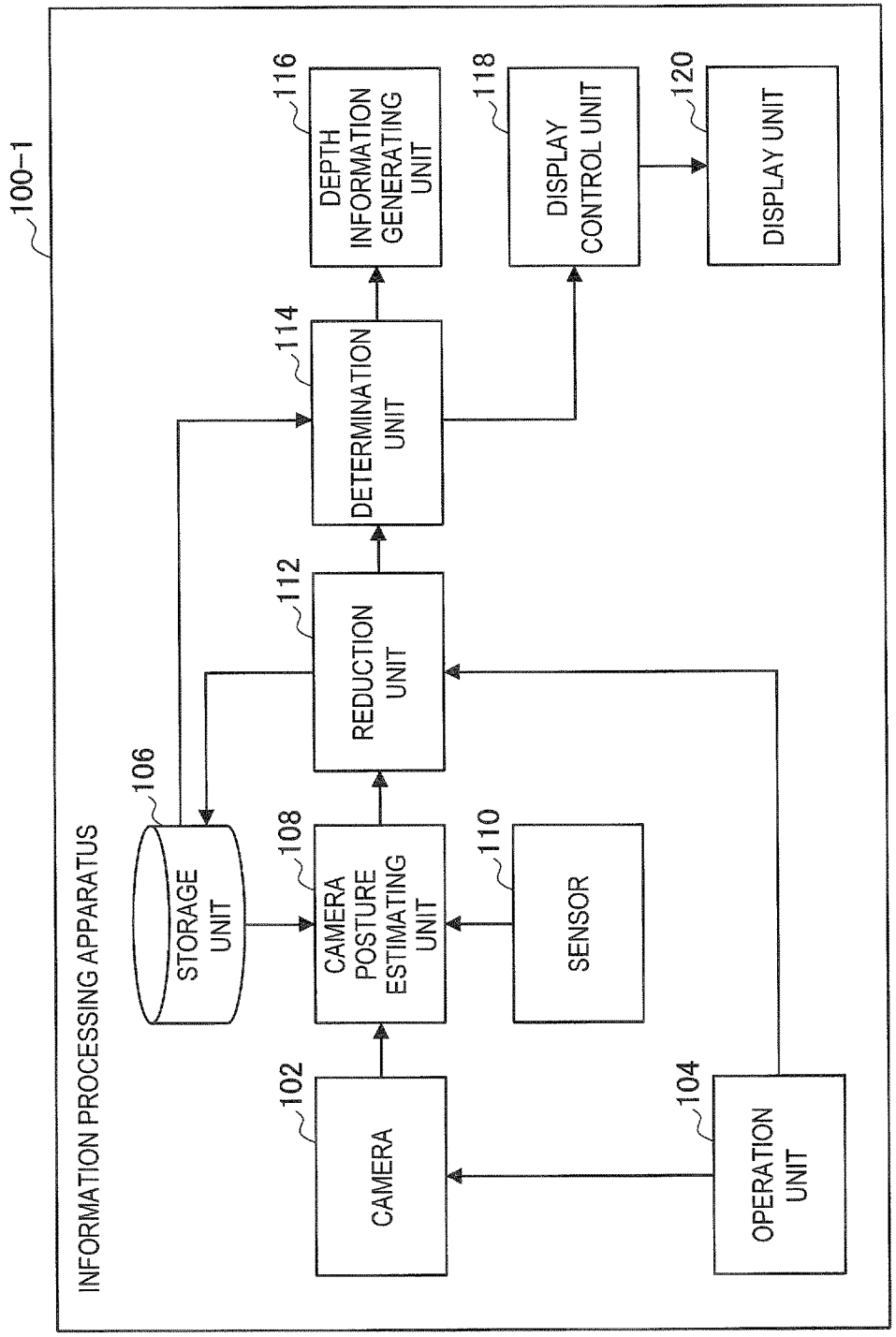
FIG. 2 is a block diagram illustrating a schematic functional configuration of an information processing apparatus according to a first embodiment of the present disclosure.

The overview of the information processing apparatus 100 according to an embodiment of the present disclosure has been described so far. Next, a configuration of the information processing apparatus 100-1 according to the first embodiment of the present disclosure will be described with reference to FIG. 2. FIG. 2 is a block diagram illustrating a schematic functional configuration of the information processing apparatus 100-1 according to the first embodiment of the present disclosure.

FIG. 2 shows that the information processing apparatus 100-1 includes a camera 102, an operation unit 104, a storage unit 106, a camera posture estimating unit 108, a sensor 110, a reduction unit 112, a determination unit 114, a depth information generating unit 116, a display control unit 118, and a display unit 120.

When a camera function of the information processing apparatus 100-1 is activated, the camera 102 starts to shoot images at predetermined time intervals. The camera 102 shoots an image on the basis of an operation detection result from the operation unit 104 in addition to image shooting at the predetermined time intervals. The image acquired through image shooting based on the operation detection result from the operation unit 104 is treated here as a standard image. The camera 102 is made of a single camera, and includes an imaging optical system such as a photographing lens and a zoom lens that condenses light and a signal conversion element such as charge coupled devices (CCDs) and complementary metal oxide semiconductors (CMOSes). The imaging optical system condenses light emitted from a subject to form an image of the subject on a signal conversion unit. The signal conversion element converts the formed image of the subject to an electric image signal. Additionally, instead of the camera 102, a read-out unit that reads out an image stored in the storage unit 106, or an input unit that accepts an image input from the outside may be installed.

The operation unit 104 detects that an operator 2 has performed an operation of shooting an image on the information processing apparatus 100-1, and causes the camera 102 to shoot an image. For example, the operation unit 104 includes a shutter button and a module configured to detect that the shutter button has been pushed down. When the shutter button is pushed down, the operation unit 104 detects that the shutter button has been pushed down, and reports the detection result to the camera 102. Additionally, the detection result is also reported to the reduction unit 112, which will be discussed below.

The storage unit 106 stores an image reduced by the reduction unit 112, which will be discussed below, and a camera posture for the reduced image. The reduced image and the camera posture are stored in association with each other.

The camera posture estimating unit 108 uses a camera posture for the last image stored in the storage unit 106 and information acquired from the sensor 110 to estimate a camera posture for an image acquired through image shooting by the camera 102. Specifically, the information from the sensor 110 indicates changes in the position and the direction of the camera 102. The camera posture estimating unit 108 uses the changes in the position and the direction of the camera 102 acquired from the sensor 110 to calculate the position and the direction of the camera 102 at and in which an image acquired through new image shooting has been shot, the position and the direction being relative to the position and the direction of a camera posture for the last image stored in the storage unit 106. The camera posture for the image acquired through image shooting based on the operation detection result from the operation unit 104 is treated here as a standard camera posture.

The camera posture estimating unit 108 may, for example, estimate a camera posture from a result of matching of pixel values between images (pixel matching) or matching of feature points (stereo matching) instead of estimating a camera posture from the information acquired from the sensor 110.

The sensor 110 detects a movement of the information processing apparatus 100-1. Specifically, the sensor 110 detects changes in the position and the direction of the information processing apparatus 100-1. For example, an acceleration sensor and an angular velocity sensor (gyro sensor), or a geomagnetic sensor instead of the angular velocity sensor may be used as the sensor 110.

The reduction unit 112 reduces an image acquired through image shooting by the camera 102 and causes the storage unit 106 to store the reduced image other than a standard image along with a camera posture estimated by the camera posture estimating unit 108. Specifically, when the operation unit 104 does not detect any operation of shooting an image, the reduction unit 112 reduces images acquired through image shooting by the camera 102 at predetermined time intervals and causes the storage unit 106 to store the reduced images. To the contrary, when the operation unit 104 detects an operation of shooting an image, i.e. when an image is acquired through image shooting by the camera 102 on the basis of an operation detection result from the operation unit 104, the reduction unit 112 reduces the image, but does not cause the storage unit 106 to store the reduced image.

The reduction unit 112 reduces the images acquired through image shooting by the camera 102 at predetermined time intervals and then stores the reduced images in the storage unit 106 in this way. The reduction unit 112 also reduces the image acquired through image shooting by the camera 102 on the basis of the operation detection result from the operation unit 104, and the reduced image is then used for the processing by the information processing apparatus 100-1. Accordingly, the reduced image can reduce the storage capacity used for processing of generating depth information.

Figure 3:
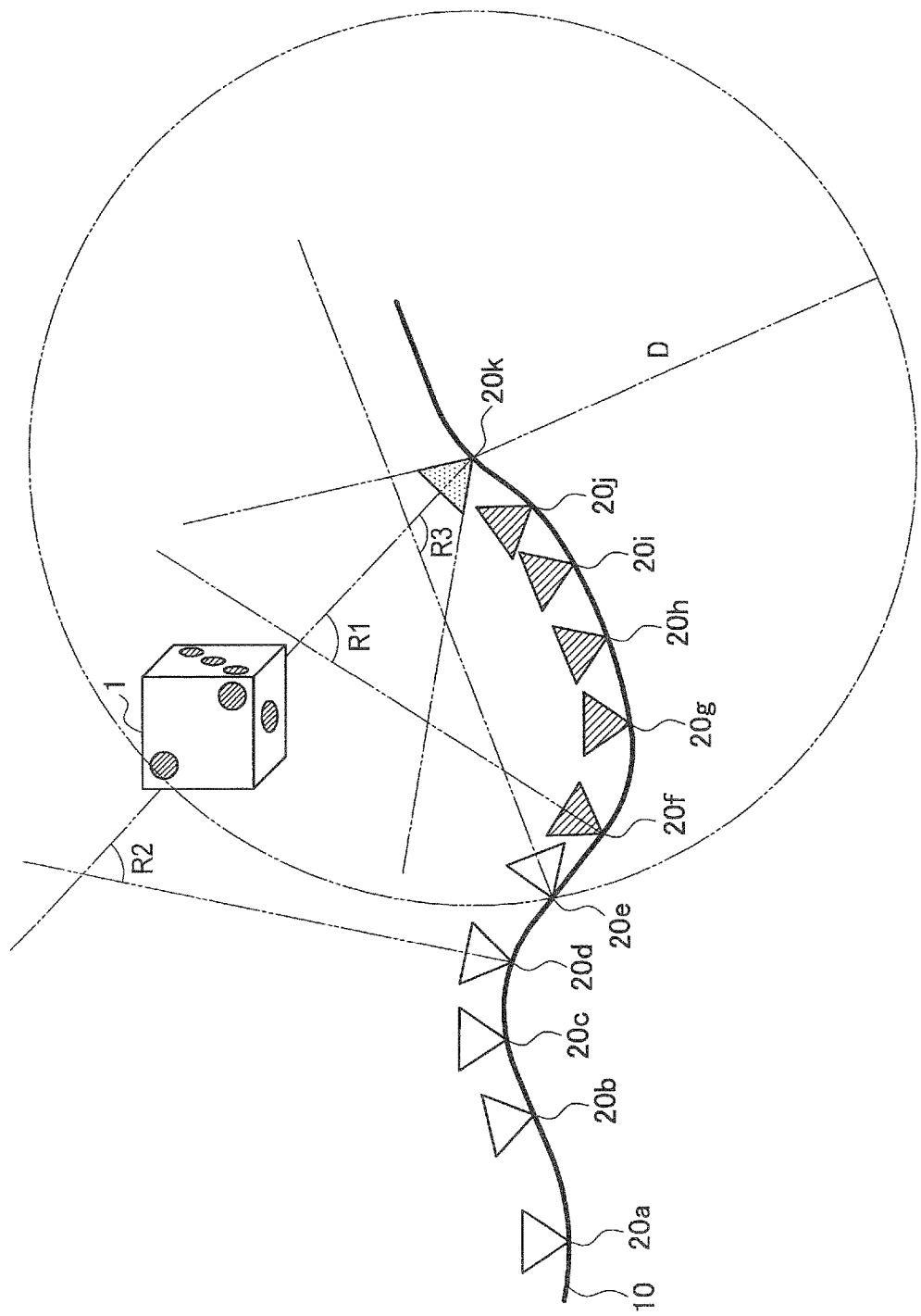
FIG. 3 is a diagram for describing an example of determination processing by a determination unit according to the first embodiment of the present disclosure.

The determination unit 114 determines whether it is possible to generate depth information. Specifically, the determination unit 114 makes a threshold determination on the number of images among the images stored in the storage unit 106 which have been acquired through image shooting within the range of camera postures decided based on a standard camera posture. For convenience of explanation, an image count M will be used below in order to indicate the number of images among the images stored in the storage unit 106 which have been acquired through image shooting within the range of camera postures decided based on a standard camera posture. The more specific description will be made with reference to FIG. 3. FIG. 3 is a diagram for describing an example of determination processing by the determination unit 114 according to the first embodiment of the present disclosure.

FIG. 3 illustrates camera postures 20a to 20k at spots at which while the information processing apparatus 100-1 having the camera 102 built therein are being moved along a trajectory 10, the camera 102 are shooting images. The camera postures 20a to 20j are for images stored in the storage unit 106, and the camera posture 20k is a standard camera posture. FIG. 3 shows that images shot in the camera postures 20f to 20j among the camera postures 20a to 20j other than the standard camera posture 20k are, for example, shot within the range of camera postures decided based on the standard camera posture 20k.

The range of camera postures decided based on the standard camera posture 20k is decided from the position and the direction of the camera 102 satisfying a predetermined condition. The predetermined condition may, for example, request the position of a camera posture for an image stored in the storage unit 106 to fall within a predetermined distance from the position of the standard camera posture 20k, and the angle between the facing direction of the camera posture for the image stored in the storage unit 106 and the facing direction of the camera in the standard camera posture 20k to be less than or equal to a predetermined angle.

The description will be made with reference to FIG. 3. When a predetermined distance D and a predetermined angle R are, for example, set as the conditions, the positions of the camera postures 20f to 20j each fall within the range of the predetermined distance D from the position of the standard camera posture 20k and the facing directions of the camera postures 20f to 20j intersect the facing direction of the standard camera posture 20k at the predetermined angle R or less. Accordingly, the camera postures 20f to 20j satisfy the conditions. For example, the position of the camera posture 20f falls within the range of the predetermined distance D from the position of the standard camera posture 20k. An angle R1 at which the facing direction of the camera posture 20f intersects the facing direction of the standard camera posture 20k is less than or equal to the predetermined angle R.

Although an angle R2 at which the facing direction of the camera posture 20d intersects the facing direction of the standard camera posture 20k is less than or equal to the predetermined angle R, the camera posture 20d does not satisfy the condition because the position of the camera posture 20d does not fall within the range of the predetermined distance D from the position of the standard camera posture 20k. Although the position of the camera posture 20e falls within the range of the predetermined distance D from the position of the standard camera posture 20k, the camera posture 20e does not satisfy the condition, either, because an angle R3 at which the facing position of the camera posture 20e intersects the facing direction of the standard camera posture 20k exceeds the predetermined angle R.

The determination unit 114 counts the number of camera postures satisfying the predetermined conditions to grasp the image count M. If the image count M exceeds a predetermined threshold, it is determined that it is possible to generate depth information. If the image count M falls short of the predetermined threshold, it is determined that it is not possible to generate depth information.

The determination unit 114 determines in this way whether it is possible to generate depth information, so that it can be avoided that the generation of depth information fails because depth information is generated when images necessary for the generation of depth information lack. This can reduce processing burdens. Furthermore, the information processing apparatus 100 generates depth information one time after the determination unit 114 makes a determination, and the information processing apparatus 100 does not generate depth information while acquiring an image. This can reduce processing burdens on the information processing apparatus 100 while the information processing apparatus 100 is acquiring an image.

Although the determination unit 114 makes a threshold determination on the image count M in the present embodiment, the determination unit 114 may further request, in addition to the conditions, camera postures for images satisfying the conditions to be dispersed within the range of camera postures decided based on the standard camera posture, and images to be shot in the dispersed camera postures. For example, the positions of camera postures for images satisfying the conditions may be uniformly distributed within the range of camera postures as an additional condition.

In this way, the condition that images among the images stored in the storage unit 106 which have been acquired through image shooting within the range of camera postures decided based on a standard camera posture are dispersed within the range of camera postures is added to a determination condition of the determination unit 114. This allows images acquired through image shooting from a variety of viewpoints to be used for the generation of depth information, resulting in the generation of more accurate depth information.

Returning to the description for the information processing apparatus 100-1 with reference to FIG. 2, the depth information generating unit 116 generates depth information when the determination unit 114 determines that it is possible to generate depth information. Specifically, when the determination unit determines that the image count M exceeds a threshold among the images stored in the storage unit 106, the depth information generating unit 116 generates depth information. A standard image, a standard camera posture, images among the images stored in the storage unit 106 which have been acquired through image shooting within the range of camera postures decided based on the standard camera posture, and camera postures for the images are used to generate depth information.

In this way, the depth information generating unit 116 generates depth information by using images among the images stored in the storage unit 106 which have been acquired through image shooting within the range of camera postures decided based on a standard camera posture. This namely means that the depth information generating unit 116 selects and processes camera postures useful for generating depth information, so that the depth information generating unit 116 can enhance the accuracy of the acquired depth information.

Depth information may be generated by a variety of general techniques. Examples of the techniques may include Dense Tracking and Mapping in Real-Time (DTAM). The acquired depth information is based on a result of matching between images of low resolution, so that the resolution may lack depending on how depth information is used. For example, the resolution of the acquired depth information may be increased, for example, by smoothing, upsampling, or a joint bilateral filter that treats, as an input, an intensity image (such as a standard image) of high resolution corresponding to the depth information.

Figure 4:
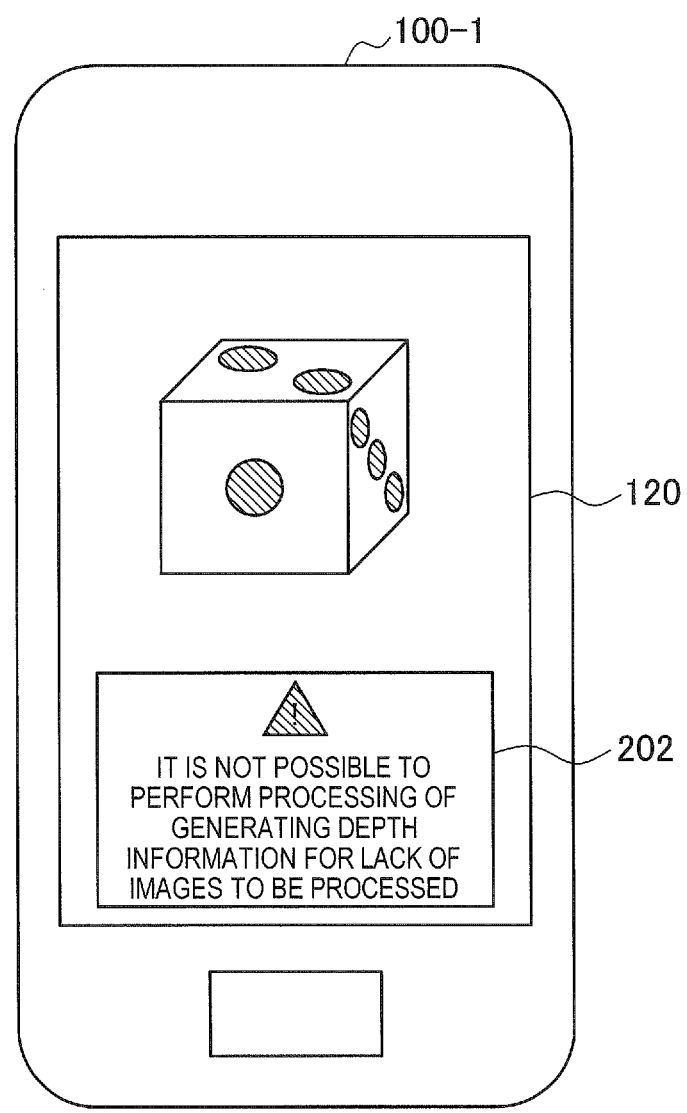
FIG. 4 is a diagram for describing an example of a guidance screen generated by a display control unit according to the first embodiment of the present disclosure.

When the determination unit 114 determines that it is not possible to generate depth information, the display control unit 118 generates a guidance screen 202 for an operator 2. Specifically, the guidance screen 202 shows the operator 2 that the number of images satisfying the conditions falls short of a predetermined threshold. The more specific description will be made with reference to FIG. 4. FIG. 4 is a diagram for describing an example of a guidance screen generated by the display control unit 118 according to the first embodiment of the present disclosure.

FIG. 4 shows that the display unit 120 of the information processing apparatus 100-1 displays a guidance screen 202. The guidance screen 202 may show an operator 2, for example, in a character string that the number of images satisfying the conditions falls short of a predetermined threshold.

When the determination unit 114 determines in this way that it is not possible to generate depth information, the display control unit 118 generates the guidance screen 202 for the operator 2, and then displays the guidance screen 202 on the display unit 120, visually showing the number of images necessary for the generation of depth information lacks. This allows the operator 2 to easily understand the reason why depth information is not generated.

Returning to the description of the information processing apparatus 100-1 with reference to FIG. 2, the display unit 120 displays the guidance screen 202 generated by the display control unit 118. The display unit 120 may, for example, display the display screen on the information processing apparatus 100-1 as illustrated in FIG. 4.

2-2. Processing by Information Processing Apparatus

Figure 5:
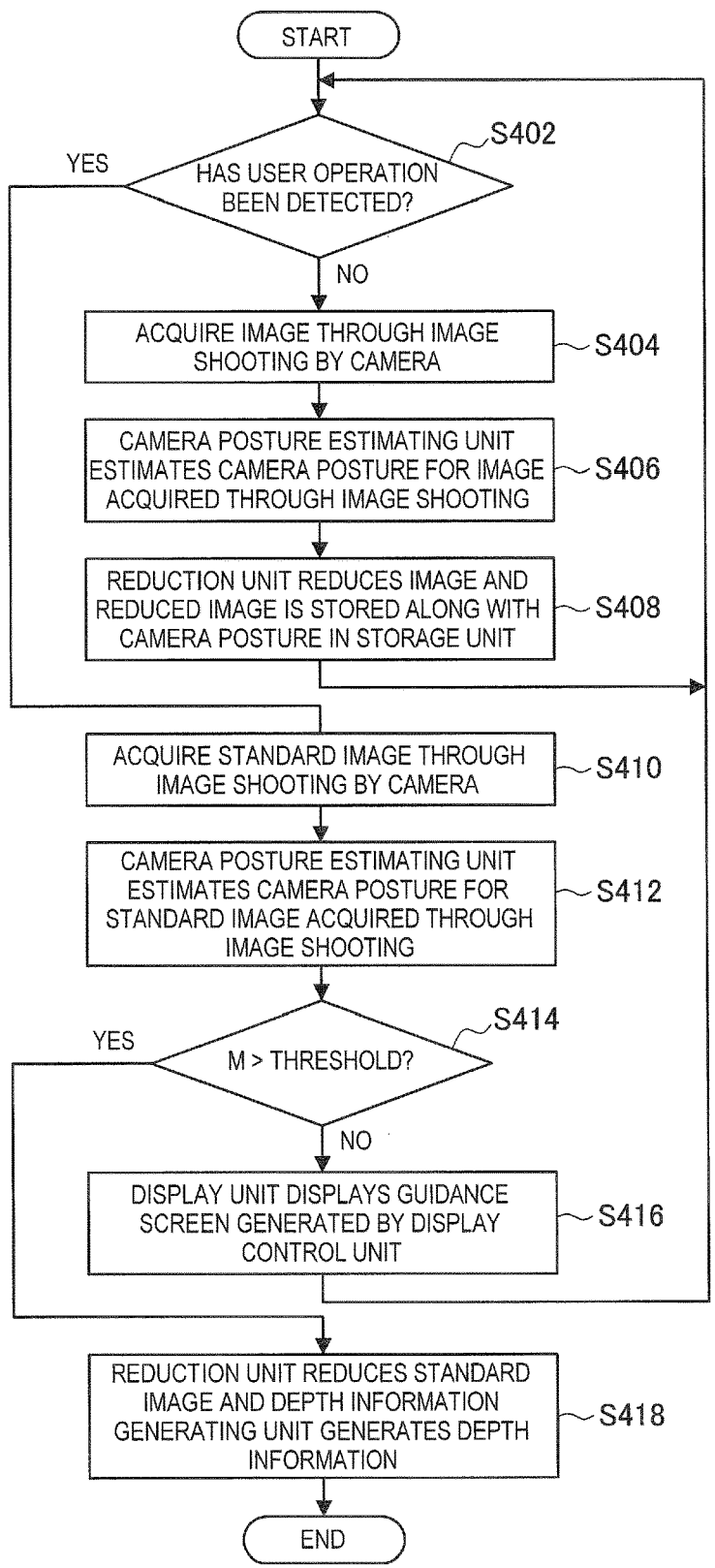
FIG. 5 is a flowchart schematically illustrating processing by the information processing apparatus in the first embodiment of the present disclosure.

Next, the processing by the information processing apparatus 100-1 according to the first embodiment of the present disclosure will be described with reference to FIG. 5. FIG. 5 is a flowchart schematically illustrating the processing by the information processing apparatus 100-1 in the first embodiment of the present disclosure.

First, it is determined whether a user operation has been detected (step S402). Specifically, it is determined whether the operation unit 104 has detected an operation of shooting an image.

If it is determined in step S402 that no user operation has been detected, the camera 102 acquires an image through image shooting (step S404). Specifically, the camera 102 acquires images through image shooting at predetermined time intervals.

Figure 6:
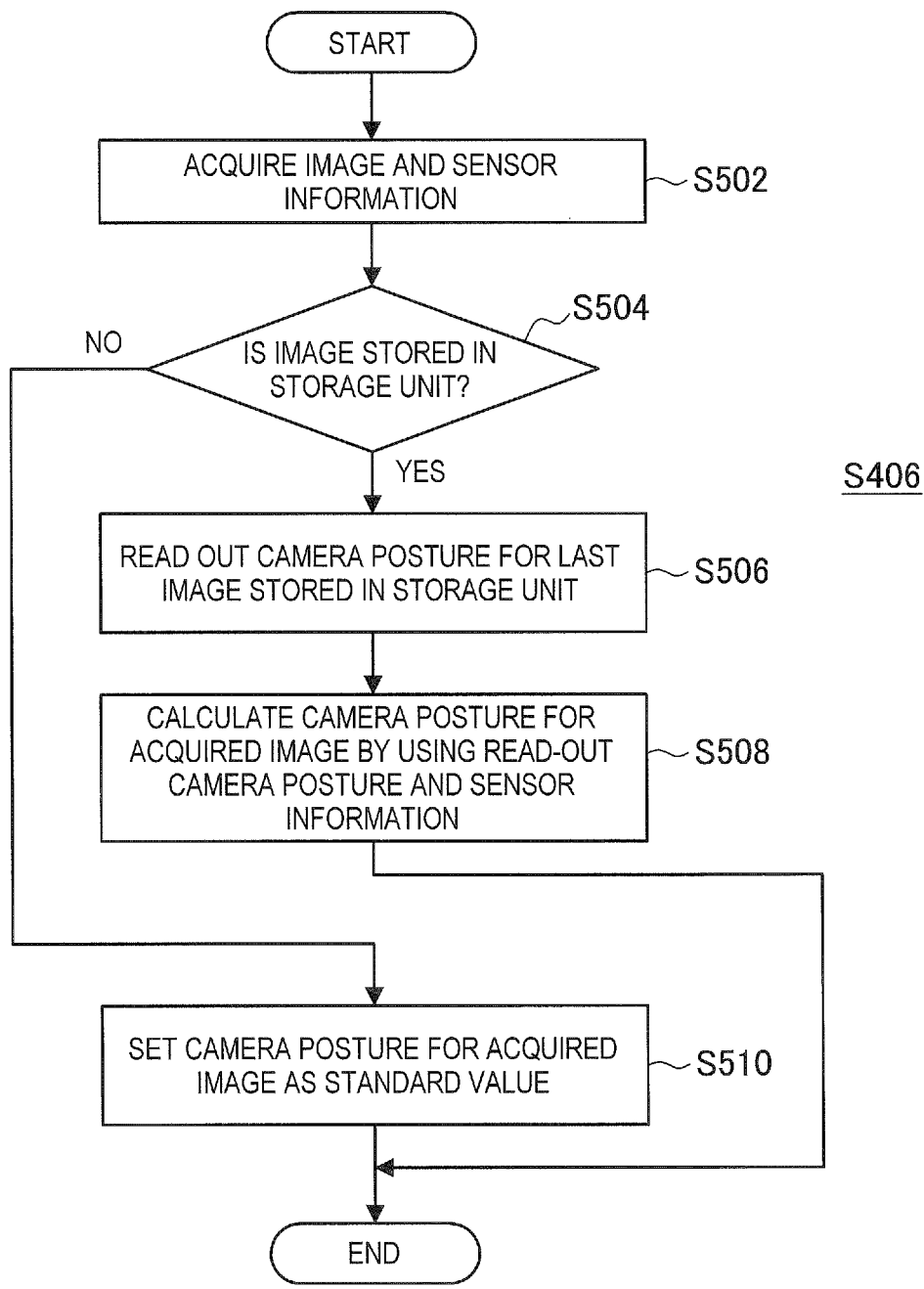
FIG. 6 is a flowchart schematically illustrating processing of estimating a camera posture in the first embodiment of the present disclosure.

Camera postures for the acquired images are then estimated by the camera posture estimating unit 108 (step S406). The more specific description will be made with reference to FIG. 6. FIG. 6 is a flowchart schematically illustrating processing of estimating a camera posture in the first embodiment of the present disclosure.

FIG. 6 shows that the camera posture estimating unit 108 acquires an image and information detected by the sensor 110 (step S502). Specifically, the acquired image is the image acquired through image shooting by the camera 102. The information detected by the sensor 110 indicates changes in the position and the direction of the camera 102 at the time of shooting the image.

Next, it is determined whether an image reduced by the reduction unit 112 is present in the storage unit 106 (step S504). A camera posture may be estimated on the basis of the relative positions and directions of the camera 102 for images at the time of shooting the images in the present embodiment. Accordingly, when there is no image that has been acquired through the last image shooting and stored, the processing proceeds to step S510 and no camera posture is estimated.

If it is determined in step S504 that the image reduced by the reduction unit 112 is present in the storage unit 106, the image acquired through the last image shooting and the camera posture are read out from the storage unit 106 (step S506).

Next, a camera posture for the acquired image is calculated on the basis of the camera posture read out from the storage unit 106 and the changes in the position and the direction of the camera 102 acquired from the sensor 110 (step S508). Specifically, an amount of the changes in the position and the direction of the camera 102 is calculated on the basis of the changes in the position and the direction of the camera 102 acquired from the sensor 110. The calculated amount of the changes is applied on the basis of the position and direction of the camera posture read out from the storage unit 106. The position and the direction of the camera posture for the acquired image are then calculated.

If it is not determined in step S504 that the image reduced by the reduction unit 112 is present in the storage unit 106, the camera posture for the acquired image is set as a standard value (step S510). A value relative to the camera posture set as a standard value will be used for a camera posture that is calculated later in the present embodiment.

Returning to the description of the processing by the information processing apparatus 100-1 with reference to FIG. 5, the reduction unit 112 reduces the acquired image, and the reduced image is stored along with the camera posture in the storage unit 106 (step S408). After the reduced image and the camera posture have been stored in the storage unit 106, the processing returns to step S402.

If it is determined in step S402 that a user operation has been detected, the camera 102 acquires a standard image through image shooting (step S410). Specifically, the camera 102 shoots an image on the basis of a result obtained by the operation unit 104 detecting an operation of shooting an image, and then acquires the standard image.

Next, the camera posture estimating unit 108 estimates a camera posture for the acquired standard image (step S412). The processing by the camera posture estimating unit 108 is the same as the processing in step S406, so that the detailed description will be omitted.

Figure 7:
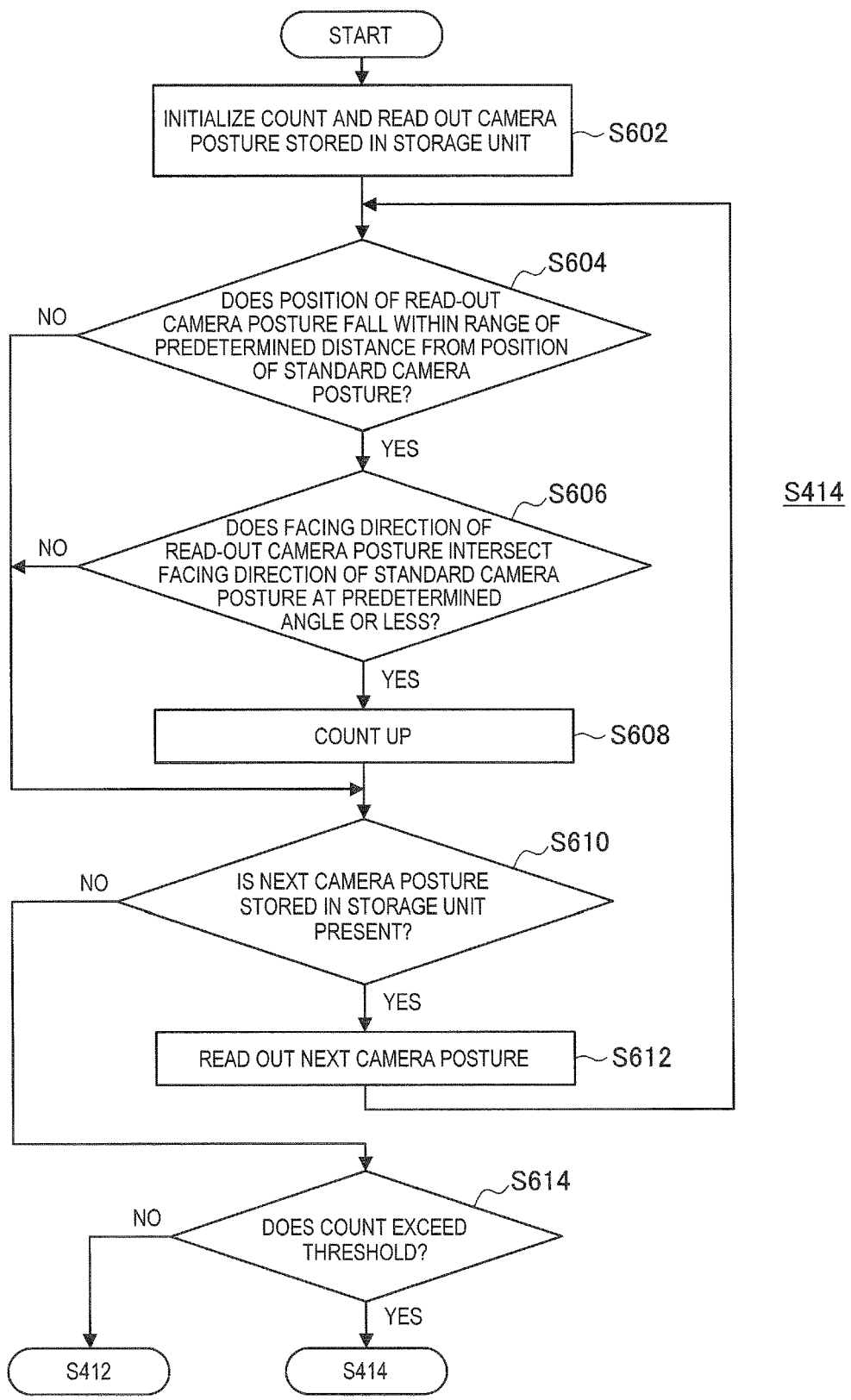
FIG. 7 is a flowchart schematically illustrating processing of determining whether it is possible to generate depth information in the first embodiment of the present disclosure.

Next, the determination unit 114 determines whether it is possible to generate depth information (step S414). Specifically, if the operation unit 104 detects an operation of shooting an image, the determination unit 114 makes a threshold determination on the image count M. The more specific description will be made with reference to FIG. 7. FIG. 7 is a flowchart schematically illustrating processing of determining whether it is possible to generate depth information in the first embodiment of the present disclosure.

FIG. 7 shows that the count for the number of images is initialized in order to prepare for the processing in step S414, and then a camera posture stored in the storage unit 106 is read out (step S602). Specifically, a counter for counting the image count M is initialized.

Next, it is determined whether the position of the read-out camera posture falls within the range of a predetermined distance from the position of a standard camera posture (step S604). Specifically, a relative distance from the position of the read-out camera posture to the position of the standard camera posture is calculated, and then the distance is compared with the predetermined distance.

If it is determined in step S604 that the position of the read-out camera posture falls within the range of the predetermined distance from the position of the standard camera posture, it is determined whether the facing direction of the camera in the read-out camera posture intersects the facing direction of the camera in the standard camera posture at a predetermined angle or less (step S606). Specifically, the intersecting angle between the facing direction of the read-out camera posture and the facing direction of the standard camera posture is calculated, and then the calculated intersecting angle is compared with the predetermined angle.

If it is determined in step S606 that the facing direction of the camera in the read-out camera posture intersects the facing direction of the camera in the standard camera posture at the predetermined angle or less, the number of images is counted up (step S608). Additionally, if negative determinations are made in step S604 or step S606, the processing proceeds to step S610.

Next, it is determined whether the next camera posture stored in the storage unit 106 is present (step S610). In other words, it is determined whether the storage unit 106 has an image for which it is determined whether the image corresponds to the image acquired through image shooting within the range of camera postures decided based on the standard camera posture.

If it is determined in step S610 that the next camera posture stored in the storage unit 106 is present, the next camera posture is read out from the storage unit 106, and then the processing returns to step S604 (step S612).

If it is determined in step S610 that the next camera posture stored in the storage unit 106 is not present, it is determined whether the counted number of images exceeds a predetermined threshold (step S614). If it is determined that the counted number of images exceeds the threshold, the processing proceeds to step S418. To the contrary, if it is not determined that the counted number of images exceeds the threshold, the processing proceeds to step S416.

Here, the description of the processing by the information processing apparatus 100-1 will be made again with reference to FIG. 5. If the determination unit 114 determines in step S411 that it is not possible to generate depth information, the display control unit 118 generates a guidance screen 202 for an operator 2, and then the display unit 120 displays the guidance screen 202 (step S416). Specifically, if the determination unit 114 determines that the image count M exceeds a predetermined threshold, the display control unit 118 generates the guidance screen 202 for the operator 2.

If the determination unit 114 determines in step S414 that it is possible to generate depth information, the reduction unit 112 reduces a standard image, and the depth information generating unit 116 generates depth information (step S418).

According to the first embodiment of the present disclosure, the information processing apparatus 100-1 estimates camera postures for images acquired through image shooting by the one camera 102 and a camera posture for the standard image in this way. The information processing apparatus 100-1 then uses a part of the reduced images stored in the storage unit 106 and the camera postures for the images, and the reduced standard image and the standard camera posture to generate depth information. Accordingly, the images acquired through image shooting are reduced and stored in the storage unit. The reduced standard image and the part of the images stored in the storage unit are used for the generation of depth information. This can reduce the processing burdens and the storage capacity for the information processing apparatus 100 including one camera to generate depth information.

2-3. Example of Guidance Screen

A guidance screen 202 generated by the display control unit 118 may prompt an operator 202 to shoot an image in an additional camera posture in the present embodiment. For example, the guidance screen 202 may be a character string that requests the information processing apparatus 100-1 to be moved in order to shoot an image.

The display control unit 118 generates a guidance screen that prompts an operator 2 to shoot an image in an additional camera posture in this way, so that the operator 2 moves the information processing apparatus 100-1. This allows the operator 2 to shoot an image in a camera posture in which no image has been shot yet. The operator 2 can thus acquire images necessary for generating depth information.

Figure 8:
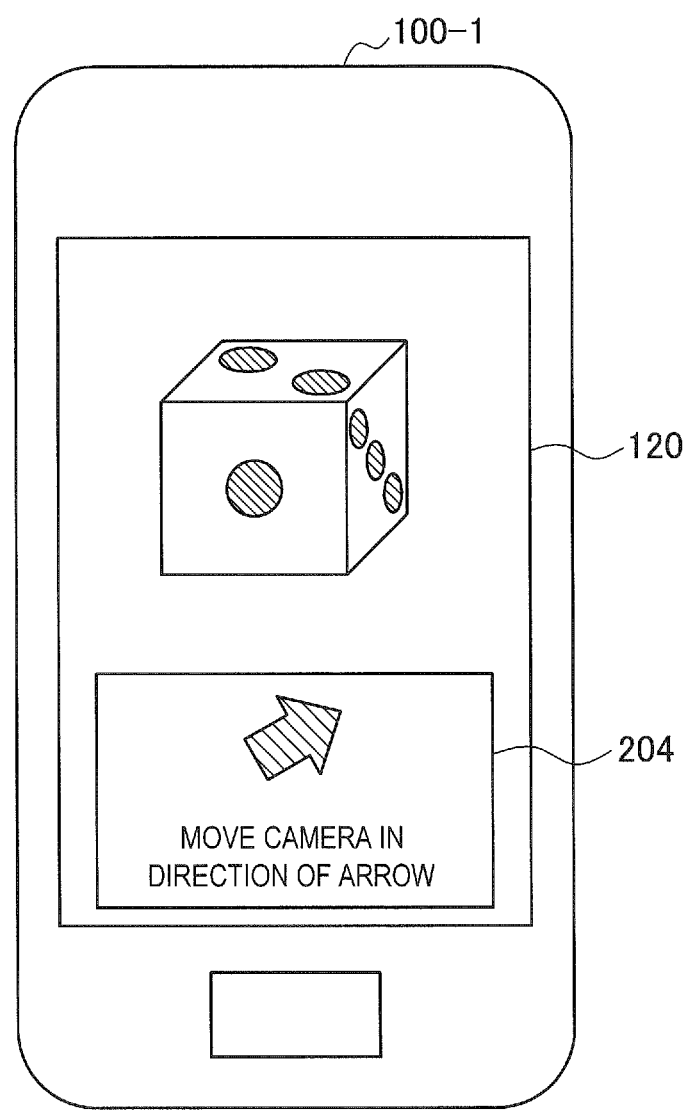
FIG. 8 is a diagram for describing an example of the guidance screen generated by the display control unit according to the first embodiment of the present disclosure.

A guidance screen 202 may further show an operator 2 a necessary camera posture specifically. Specifically, the determination unit 114 may determine image shooting in a camera posture lacking among image shooting within the range of camera postures decided based on a standard camera posture, on the basis of the camera postures stored in the storage unit 106. The display control unit 118 may then generate a guidance screen that recommends image shooting in the lacking camera posture. The more specific description will be made with reference to FIG. 8. FIG. 8 is a diagram for describing an example of a guidance screen generated by the display control unit 118 according to the first embodiment of the present disclosure.

FIG. 8 shows that the display unit 120 of the information processing apparatus 100-1 displays a guidance screen 204 including an arrow image. The arrow image displayed on the guidance screen 204 indicates the direction of a camera posture in which an operator 2 is requested to shoot an image. The direction of the arrow is calculated by the display control unit 118 on the basis of the lacking camera posture determined by the determination unit 114. For example, the position of the lacking camera posture determined by the determination unit 114 may be compared with the position of a current camera posture. The direction from the position of the current camera posture to the position of the lacking camera posture may be calculated.

In this way, the display control unit 118 generates the guidance screen 204 on the basis of the lacking camera posture determined by the determination unit 114, the guidance screen 204 recommending image shooting in the lacking camera posture, and the display unit 120 displays the guidance screen 204. This allows the operator 2 to intuitively understand the lacking image camera posture and prompts the operator 2 to shoot an image in the lacking image camera posture. Accordingly, images necessary for the generation of desired depth information can be acquired sooner.

2-4. Example Behavior of Information Processing Apparatus when Images Necessary for Generation of Depth Information Lack When the operator 2 shoots an image but images necessary for the generation of depth information still lack, the camera 102 may perform control such that an image is not shot in order to acquire a standard image in the present embodiment. Specifically, the camera posture estimating unit 108 estimates a camera posture in which the operator 2 has shot an image. The determination unit 114 makes a threshold determination on the number of images among the images stored in the storage unit 106 which have been acquired through image shooting within the range of camera postures decided based on the camera posture in which the operator 2 has shot an image. If the determination unit 114 determines that the number of images falls short of a threshold, the camera 102 does not shoot an image in order to acquire a standard image.

More specifically, if the operation unit 104 detects an operation of shooting an image, the camera posture estimating unit 108 estimates a camera posture, and the determination unit 114 makes a threshold determination on the number of images among the images stored in the storage unit 106 which have been acquired through image shooting within the range of camera postures decided based on the camera posture in which the operation unit 104 has detected the operation of shooting an image. If the determination unit 114 determines that the number of images falls short of a threshold, the camera 102 does not shoot an image in order to acquire a standard image. If the determination unit 114 determines that the number of images exceeds the threshold, the camera 102 shoots an image and the acquired image is set as a standard image. For example, when the operator 2 tries to press a shutter button and shoot an image in order to acquire a standard image but images necessary for the generation of depth information still lack, the camera 102 may be controlled such that the shutter is not activated.

The camera posture estimating unit 108 estimates a camera posture in which the operation unit 104 has detected an operation of shooting an image in this way. The determination unit 114 makes a threshold determination on the number of images among the images stored in the storage unit 106 which have been acquired through image shooting within the range of camera postures decide based on the camera posture in which the operation unit 104 has detected the operation of shooting an image. If the determination unit 114 determines that the number of images falls short of a threshold, the camera 102 does not shoot an image in order to acquire a standard image. The camera 102 can hereby use a response of the information processing apparatus 100-1 to the operation of shooting an image to allow the operator 2 to intuitively understand that the camera 102 is unable to shoot an image in order to acquire a standard image, even though the camera 102 does not have any function of visually notifying the operator 2 like the display unit 120 and the like. Thus, it is possible to prompt the operator 2 to shoot images necessary for the generation of depth information.

3. SECOND EMBODIMENT

3-1. Configuration of Information Processing Apparatus

Figure 9:
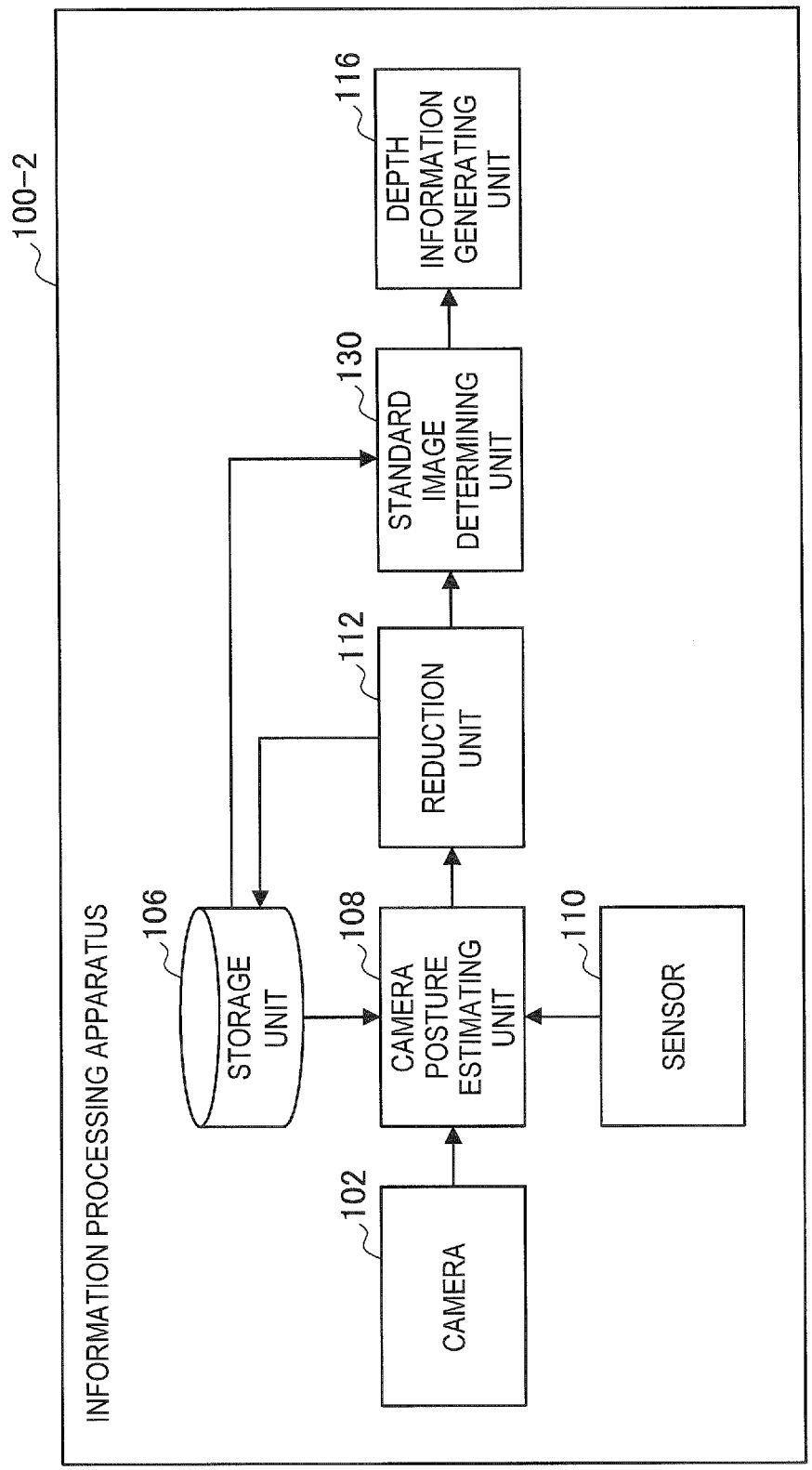
FIG. 9 is a block diagram illustrating a schematic functional configuration of an information processing apparatus according to a second embodiment of the present disclosure.

The information processing apparatus 100-1 according to the first embodiment of the present disclosure has been described so far. Next, a configuration of an information processing apparatus 100-2 according to a second embodiment of the present disclosure will be described with reference to FIG. 9. FIG. 9 is a block diagram illustrating a schematic functional configuration of the information processing apparatus 100-2 according to the second embodiment of the present disclosure.

FIG. 9 shows that the information processing apparatus 100-2 includes a standard image determining unit 130 in addition to a camera 102, a storage unit 106, a camera posture estimating unit 108, a sensor 110, a reduction unit 112, and a depth information generating unit 116.

The standard image determining unit 130 determines an image that is to be set as a standard image among the images stored in the storage unit 106, and sets the determined image as a standard image.

Figure 10:
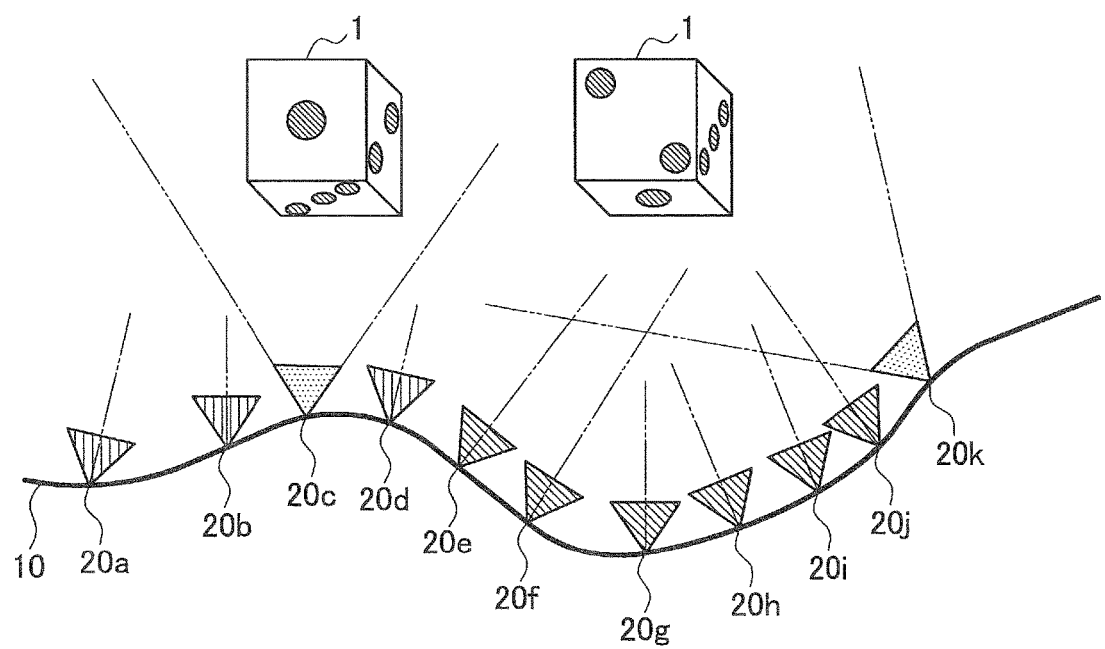
FIG. 10 is a diagram for describing an example of processing by a standard image determining unit according to the second embodiment of the present disclosure.

Specifically, if the images stored in the storage unit 106 satisfy a predetermined condition, the standard image determining unit 130 makes a threshold determination on the number of images among the images stored in the storage unit 106 which have been acquired through image shooting within the range of camera postures decided based on camera postures for the respective images. For convenience of explanation, the number of images among the images stored in the storage unit 106 which have been acquired through image shooting within the range of camera postures decided based on camera postures for the respective images will be referred to as image count M1 below. The image having the most large image count M1 is set as a standard image in a group of images exceeding the threshold. Examples of the determination on the predetermined condition may include a threshold determination on the number of images stored in the storage unit 106. The more specific description will be made with reference to FIG. 10. FIG. 10 is a diagram for describing an example of the processing by the standard image determining unit 130 according to the second embodiment of the present disclosure.

FIG. 10 shows camera postures 20a to 20k at spots at which the camera 102 shoots images while the information processing apparatus 100-2 having the camera 102 built therein is moved along a trajectory 10. The camera postures 20a to 20k are for images stored in the storage unit 106.

For example, when four is used as a threshold for the determination of a predetermined condition of images stored in the storage unit 106, the standard image determining unit 130 performs processing for the camera postures 20a to 20d after an image acquired through image shooting in the camera posture 20d is stored in the storage unit 106. The standard image determining unit 130 makes the same threshold determination on each of the camera postures 20a to 20d as the determination unit 114 according to the first embodiment of the present disclosure has done to determine the image count M1 of each of the camera postures 20a to 20d. The image counts M1 determined to exceed a threshold are compared with each other. An image acquired through image shooting in the camera posture 20c having the largest image count M1 is set as a standard image.

Next, once an image acquired through image shooting in the camera posture 20h is stored in the storage unit 106, the number of images stored in the storage unit 106 becomes four. Accordingly, the standard image determining unit 130 performs processing for the camera postures 20e to 20h. The standard image determining unit 130 makes the same threshold determination on each of the camera postures 20e to 20h as the determination unit 114 according to the first embodiment of the present disclosure has done to determine the image count M1 of each of the camera postures 20e to 20h. However, since the image counts M1 of the respective camera postures 20e to 20h all fall short of the threshold, the processing by the standard image determining unit 130 is called off.

The same as the camera posture 20h applies to the camera postures 20i and 20j, so that the processing by the standard image determining unit 130 is called off. Since the image count M1 of the camera posture 20k exceeds the threshold and is the largest among the camera postures 20e to 20k, an image acquired through image shooting in the camera posture 20k is set as a standard image.

3-2. Processing by Information Processing Apparatus

Figure 11:
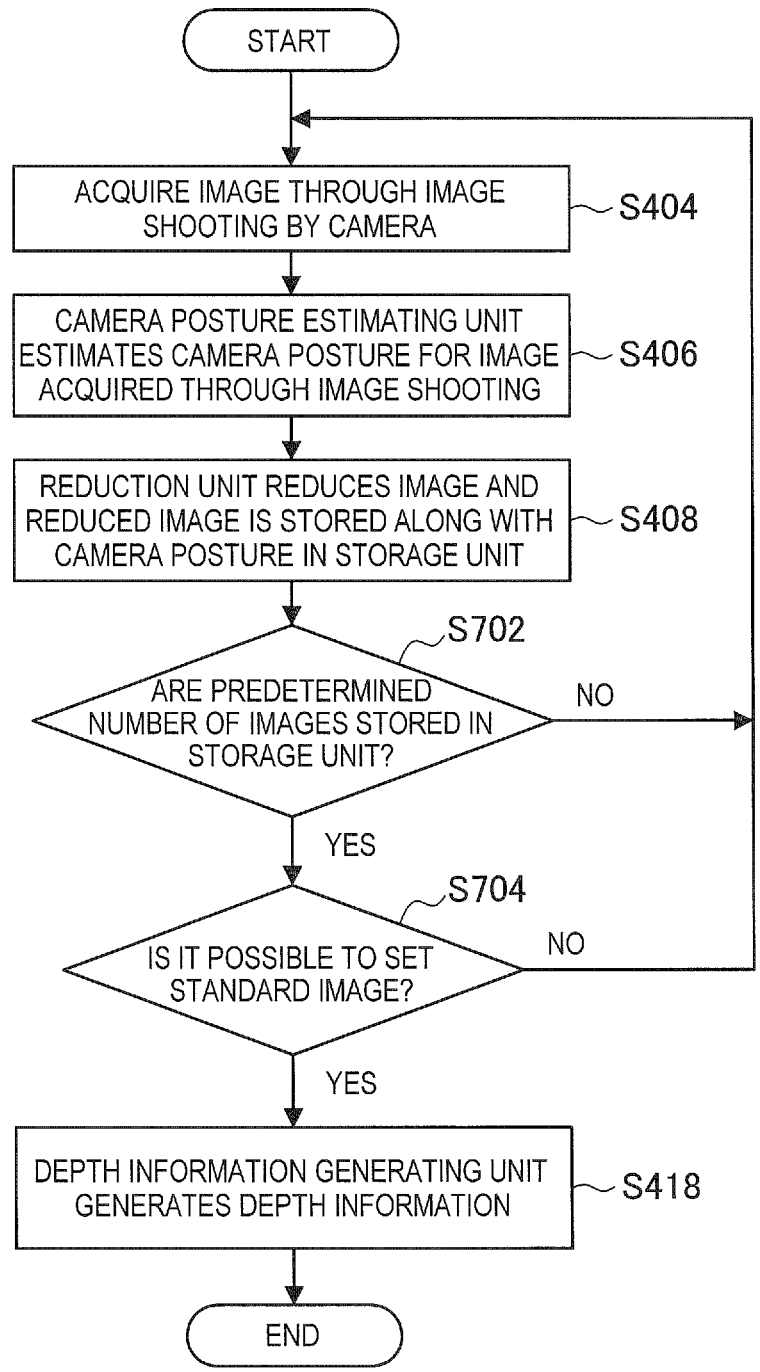
FIG. 11 is a flowchart schematically illustrating processing by the information processing apparatus in the second embodiment of the present disclosure.

Next, the processing by the information processing apparatus 100-2 according to the second embodiment will be described with reference to FIG. 11. FIG. 11 is a flowchart schematically illustrating the processing by the information processing apparatus 100-2 in the second embodiment of the present disclosure.

First, after the processing in steps S404, S406, and S408, the standard image determining unit 130 makes a threshold determination on the number of images stored in the storage unit 106 (step S702). If it is determined in step S702 that the number of images stored in the storage unit 106 falls short of a threshold, the processing returns to step S402.

If it is determined in step S702 that the number of images stored in the storage unit 106 exceeds the threshold, it is determined whether it is possible to set a standard image (step S704). The specific description will be made with reference to FIG. 12. FIG. 12 is a flowchart schematically illustrating processing of determining whether it is possible to set a standard image in the second embodiment of the present disclosure.

FIG. 12 shows that setting processing is performed in order to prepare for the processing in step S704 (step S802). Specifically, the setting of a temporary standard image is initialized, and then a camera posture stored in the storage unit 106 is read out.

Next, a threshold determination is made on the image count M1 of the read-out camera posture (step S804). Specifically, the read-out camera posture is set as a standard camera posture, and then the same threshold determination as described for the processing by the determination unit 114 according to the first embodiment of the present disclosure (step S414) is made. The details of the threshold determination processing are substantially the same as the processing in step S414, so that the detailed description will be omitted.

If it is determined in step S804 that the image count M1 exceeds the threshold, the image count M1 is compared with the image count M1 of the temporary standard camera posture (step S806). For convenience of explanation, the image count M1 of the temporary standard image will be referred to as image count M2 below.

If it is determined in step S806 that the image count M1 exceeds the image count M2, an image in the read-out camera posture is set as a temporary standard image instead of the current temporary standard image (step S808). If negative determinations are made in step S804 and step S806, the processing proceeds to step S810.

Next, it is determined whether the next camera posture stored in the storage unit 106 is present (step S810). In other words, it is determined whether the storage unit 106 has an image for which it is determined whether the image corresponds to the image acquired through image shooting within the range of camera postures decided based on the read-out camera posture.

If it is determined in step S810 that the next camera posture stored in the storage unit 106 is present, the camera posture is read out from the storage unit 106, and then the processing returns to step S804 (step S812).

The processing in steps S804 to S812 is repeatedly performed on camera postures for images stored in the storage unit 106, and an image having the largest image count M1 among the images stored in the storage unit 106 is set as a temporary standard image.

If it is determined in step S810 that the next camera posture stored in the storage unit 106 is not present, it is determined whether a temporary standard image has been set (step S814).

If it is determined in step S814 that a temporary standard image has been set, an image set as the temporary standard image is set as a standard image and the processing proceeds to step S418 (step S816).

If it is determined in step S814 that no temporary standard image has been set, the processing returns to step S404.

According to the second embodiment of the present disclosure, the information processing apparatus 100-2 determines an image having the largest image count M1 among the images stored in the storage unit 106, and generates depth information by using the determined image as a standard image in this way. Accordingly, an image among the images stored in the storage unit 106, the image having the largest number of images necessary for generating depth information, is selected as a standard image. This allows for the generation of more accurate depth information.

4. HARDWARE CONFIGURATION

The embodiments of the present disclosure have been described so far. The processing by the information processing apparatus 100 is implemented by the cooperation of software with hardware of the information processing apparatus, which will be described below.

FIG. 13 is an explanatory diagram illustrating a hardware configuration of an information processing apparatus 100 according to an embodiment of the present disclosure. FIG. 13 shows that the information processing apparatus 100 includes a central processing unit (CPU) 142, read only memory (ROM) 144, random access memory (RAM) 146, a bridge 148, a bus 150, an interface 152, an input device 154, an output device 156, a storage device 158, a drive 160, a connection port 162, and a communication device 164.

The CPU 142 functions as a processing device and a control device, and realizes the operations of a camera posture estimating unit 108, a reduction unit 112, a determination unit 114, a depth information generating unit 116, a display control unit 118, and a standard image determining unit 130 inside the information processing apparatus 100 in cooperation with a variety of programs. The CPU 142 may also be a microprocessor. The ROM 144 stores a program, an operation parameter, or the like that is used by the CPU 142. The RAM 146 temporarily stores a program used upon the execution of the CPU 142 or a parameter that changes as desired upon the execution. A part of the storage unit 106 inside the information processing apparatus 100 is realized by the ROM 144 and the RAM 146. The CPU 142, the ROM 144, and the RAM 146 are connected to each other via an internal bus including a CPU bus.

The input device 154 includes an input unit such as mouses, keyboards, touch panels, buttons, microphones, switches, and levers that are examples of the operation unit 104 of the information processing apparatus 100 according to the present embodiment, and are used for a user to input information, the camera 102 built in the information processing apparatus 100, and an input control circuit that generates an input signal on the basis of an input from the user and an input from the camera 102 and outputs the generated input signal to the CPU 142. A user of the information processing apparatus 100 operates the input device 154 to input a variety of data to the information processing apparatus 100 and to issue an instruction of a processing operation.

The output device 156 makes an output to a display device such as liquid crystal display (LCD) devices, organic light emitting diode (OLED) devices, and lamps as an example of the display unit 120 of the information processing apparatus 100. The output device 156 may further make an audio output to a speaker, a headphone, and the like.

The storage device 158 is a data storage device configured as an example of the storage unit 106 of the information processing apparatus 100 according to the present embodiment. The storage device 158 may include a storage medium, a recording device that records data on a storage medium, a read-out device that reads data out from a storage medium, and a deletion device that deletes data recorded on a recording medium. The storage device 158 stores a program and a variety of data executed by the CPU 142.

The drive 160 is a reader/writer for a storage medium, and is built in or externally attached to the information processing apparatus 100. The drive 160 reads out information recorded on a removable storage medium such as mounted magnetic disks, optical discs, magneto-optical disks, and semiconductor memory, and outputs the read-out information to the RAM 144. The drive 160 can also write information into a removable storage medium.

The connection port 162 is, for example, a bus used for a connection to an information processing apparatus or a peripheral apparatus outside of the information processing apparatus 100. The connection port 162 may also be a universal serial bus (USB).

The communication device 164 is, for example, a communication interface including a communication device for a connection to a network. The communication device 164 may also be a communication device supporting a wireless local area network (LAN), a communication device supporting Long Term Evolution (LTE), or a wired communication device performing wired communication.

5. CONCLUSION

According to the first embodiment of the present disclosure, images acquired through image shooting are reduced and stored in the storage unit 106, and a standard image that is not reduced a part of the images stored in the storage unit 106 are used for the generation of depth information, thereby allowing the processing burdens and the storage capacity for the information processing apparatus 100 including one camera to generate depth information to be reduced. According to the second embodiment of the present disclosure, an image among the images stored in the storage unit 106 which has the most images necessary for the generation of depth information is selected as a standard image, thereby allowing more accurate depth information to be generated.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The steps illustrated in the flowcharts in the embodiments naturally include processes performed in the described and chronological order, and further include processes that are not necessarily performed in chronological order, but are also performed in parallel or are individually performed. Needless to say, it is also possible to change the order as necessary even in the steps for chronologically performing the processes.

The advantageous effects described herein are merely explanatory or illustrative, and not limited. The technology according to the present disclosure may attain other advantageous effects obvious to those skilled in the art from the present specification in addition to the above-described advantageous effects or instead thereof.

Additionally, the present technology may also be configured as below:

(1) An information processing apparatus including:
an acquisition unit configured to acquire one standard image and images of lower resolution than resolution of the standard image, the standard image and images of lower resolution being acquired through image shooting by one camera;
a camera posture estimating unit configured to estimate a first camera posture in which the standard image has been shot and second camera postures in which the images have been shot;
a storage unit configured to store each of the images along with each of the second camera postures; and
a depth information generating unit configured to generate depth information on the standard image by using the standard image, an image obtained by lowering the resolution of the standard image and the first camera posture, and at least a part of the images and a second camera posture for the part of the images.

(2) The information processing apparatus according to (1), further including:
a determination unit configured to make a threshold determination on the number of images among the images stored in the storage unit which have been acquired through image shooting within a range of camera postures decided based on the first camera posture,
wherein the depth information generating unit generates the depth information when the determination unit determines that the number of images exceeds a threshold.

(3) The information processing apparatus according to (2), wherein the depth information generating unit generates the depth information by using, as at least the part of the images, an image among the images stored in the storage unit which has been acquired through image shooting within the range of camera postures.

(4) The information processing apparatus according to (2), further including:
a display control unit configured to display a guidance screen for a user when the determination unit determines that the number of images falls short of the threshold.

(5) The information processing apparatus according to (2), wherein the determination unit makes a threshold determination on the number of images among the images stored in the storage unit which have been acquired through image shooting in camera postures dispersed within the range of camera postures, and
wherein the depth information generating unit generates the depth information when the determination unit determines that the number of images exceeds the threshold.

(6) The information processing apparatus according to (4), wherein the guidance screen indicates that the number of images lacks.

(7) The information processing apparatus according to (4), wherein the guidance screen prompts a user to shoot an image in an additional camera posture.

(8) The information processing apparatus according to (7), wherein the determination unit determines image shooting in a camera posture lacking in image shooting within the range of camera postures decided based on the first camera posture, on the basis of each of the second camera postures stored in the storage unit, and
wherein the guidance screen recommends image shooting in the lacking camera posture.

(9) The information processing apparatus according to any one of (2) to (8),
wherein the standard image is acquired through image shooting based on a user operation, and
wherein the images are acquired before the standard image is acquired.

(10) The information processing apparatus according to (9),
wherein the camera posture estimating unit estimates a camera posture in which the user operation has been performed,
wherein the determination unit makes a threshold determination on the number of images among the images stored in the storage unit which have been acquired through image shooting within a range of camera postures decided based on the camera posture in which the user operation has been performed, and
wherein the camera does not shoot an image to acquire the standard image when the determination unit determines that the number of images falls short of the threshold.

(11) The information processing apparatus according to any one of (1) to (10),
wherein the depth information generating unit increases resolution of depth information by using the standard image, the depth information being obtained through matching of the image obtained by lowering the resolution of the standard image with the images.

(12) An information processing method including:
acquiring one standard image and images of lower resolution than resolution of the standard image, the standard image and the images of lower resolution being acquired through image shooting by one camera;
estimating a first camera posture in which the standard image has been shot and second camera postures in which the images have been shot;
storing each of the images along with each of the second camera postures; and generating depth information on the standard image by using the standard image, an image obtained by lowering the resolution of the standard image and the first camera posture, and at least a part of the images and a second camera posture for the part of the images.

What is claimed is:

1. An information processing apparatus, comprising:
one or more processors configured to:
   acquire, by a camera, a standard image of a first resolution;
   acquire, by the camera, a first plurality of images of a second resolution,
      wherein the second resolution is lower than the first resolution;
   estimate a first camera posture corresponding to the standard image and a plurality of camera postures corresponding to the first plurality of images,
      wherein the first camera posture is determined based on a facing direction of the camera at a time the standard image is captured by the camera;
   determine a first range of camera postures based on the first camera posture;
   determine a number of a second plurality of images among the first plurality of images that are within the determined first range of camera postures;
   compare the number of the second plurality of images with a threshold value; and
   generate depth information, that corresponds to a relative distance in a depth direction between a subject in the standard image and the camera, based on the comparison, the second plurality of images, the standard image, a first image that is obtained based on reduction in the first resolution of the standard image, the first camera posture, at least one image among the first plurality of images, and a second camera posture among the plurality of camera postures,
      wherein the second camera posture corresponds to the at least one image; and
a memory configured to store each of the first plurality of images and each of the plurality of camera postures.

2. The information processing apparatus according to claim 1,
wherein the one or more processors are further configured to generate the depth information based on a second image among the first plurality of images, and
wherein the second image is acquired by the camera within the first range of camera postures.

3. The information processing apparatus according to claim 1, further comprising:
a display screen configured to display a guidance screen based on the comparison of the number of the second plurality of images with the threshold value.

4. The information processing apparatus according to claim 1, wherein the number of the second plurality of images among the first plurality of images are uniformly distributed within the first range of camera postures.

5. The information processing apparatus according to claim 3, wherein the guidance screen is further configured to indicate that the number of the second plurality of images is less than the threshold value based on the comparison.

6. The information processing apparatus according to claim 3, wherein the guidance screen is further configured to display an arrow image, that indicates a direction of a third camera posture, for user assistance in acquisition of a second image by the camera in the third camera posture,
wherein the third camera posture is within the first range of camera postures.

7. The information processing apparatus according to claim 3, wherein the one or more processors are further configured to determine a third camera posture within the first range of camera postures based on each of the stored plurality of camera postures,
wherein the third camera posture is different from each of the plurality of camera postures, and
wherein the guidance screen is further configured to display an arrow image for user assistance in acquisition of a second image by the camera in the third camera posture.

8. The information processing apparatus according to claim 7, wherein the one or more processors are further configured to:
acquire the standard image based on a user operation on the information processing apparatus, and
acquire the first plurality of images prior to the acquisition of the standard image.

9. The information processing apparatus according to claim 1, wherein the one or more processors are further configured to:
determine, based on the comparison, that the number of the second plurality of images is less than the threshold value;
estimate a third camera posture that corresponds to a user operation on the information processing apparatus,
determine a second range of camera posture based on the third camera posture;
determine a number of a third plurality of images among the first plurality of images that are within the second range of camera postures; and
generate the depth information based on the third plurality of images.

10. The information processing apparatus according to claim 1, wherein the one or more processors are further configured to:
increase resolution of the depth information based on the standard image, and
obtain the depth information based on a comparison of the first image with the first plurality of images.

11. An information processing method, comprising:
acquiring, by a camera, a standard image of a first resolution;
acquiring, by the camera, a first plurality of images of a second resolution,
   wherein the second resolution is lower than the first resolution;
estimating a first camera posture corresponding to the standard image and a plurality of camera postures corresponding to the first plurality of images,
   wherein the first camera posture is determined based on a facing direction of the camera at a time the standard image is captured by the camera;
determining a first range of camera postures based on the first camera posture;
determining a number of a second plurality of images among the first plurality of images that are within the determined first range of camera postures;
comparing the number of the second plurality of images with a threshold value;
storing each of the first plurality of images and each of the plurality of camera postures; and
generating depth information, that corresponds to a relative distance in a depth direction between a subject in the standard image and the camera, based on the comparison, the second plurality of images, the standard image, a first image obtained by lowering the first resolution of the standard image, the first camera posture, at least one image among the first plurality of images, and a second camera posture among the plurality of camera postures, wherein the second camera posture corresponds to the at least one image.

* * * * *